(12) United States Patent
Lin et al.

(10) Patent No.: US 12,386,350 B2
(45) Date of Patent: Aug. 12, 2025

(54) HANDLING MACHINE CONTROL METHOD, HANDLING MACHINE CONTROL SYSTEM AND CONTROL HOST

(71) Applicant: Industrial Technology Research Institute, Hsinchu (TW)

(72) Inventors: Kang-Chiao Lin, Hsinchu County (TW); Yu-Dai Yan, Tainan (TW); Shu-Ping Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 140 days.

(21) Appl. No.: 17/563,054

(22) Filed: Dec. 28, 2021

(65) Prior Publication Data

US 2023/0161348 A1 May 25, 2023

(30) Foreign Application Priority Data

Nov. 23, 2021 (TW) .................................. 110143515

(51) Int. Cl.
  *G05D 1/00* (2024.01)
  *B66F 9/075* (2006.01)
  *B66F 9/24* (2006.01)
(52) U.S. Cl.
  CPC ......... *G05D 1/0212* (2013.01); *B66F 9/0755* (2013.01); *B66F 9/24* (2013.01); *G05D 1/0231* (2013.01); *G05D 1/0291* (2013.01)
(58) Field of Classification Search
  CPC .. G05D 1/0212; G05D 1/0231; G05D 1/0291; G05D 2201/0216; G05D 1/0225;
  (Continued)

(56) References Cited

U.S. PATENT DOCUMENTS

| 9,635,346 B2 | 4/2017 | Iida |
| 10,328,578 B2 | 6/2019 | Holz |

(Continued)

FOREIGN PATENT DOCUMENTS

| CN | 102502141 | 6/2012 |
| CN | 208292047 | 12/2018 |

(Continued)

OTHER PUBLICATIONS

"Office Action of Taiwan Counterpart Application", issued on Aug. 22, 2022, p. 1-p. 15.

(Continued)

*Primary Examiner* — Faris S Almatrahi
*Assistant Examiner* — Dana F Artimez
(74) *Attorney, Agent, or Firm* — JCIPRNET (57) ABSTRACT

A handling machine control method, a handling machine control system and a control host are provided. The method includes: detecting a handling instruction which instructs a handling of a first object; reading handling information of the first object according to the handling instruction; if the handling information of the first object is read, control, according to the handling information, a first handling machine to move to a first position and perform a first operation to lift up the first object at the first position; after the first object is lifted up, control the first handling machine to move to a second position and perform a second operation to put down the first object at the second position; and in response to that the first object is put down at the second position, updating the handling information of the first object.

12 Claims, 3 Drawing Sheets

(58) Field of Classification Search
CPC .. G05D 1/0246; G05D 1/0282; B66F 9/0755; B66F 9/24; G06Q 10/0832; G06Q 50/28; Y02P 90/02
See application file for complete search history.

(56) References Cited

U.S. PATENT DOCUMENTS

| | | | |
|---|---|---|---|
| 10,640,347 B2 | 5/2020 | Shah et al. | |
| 2011/0010023 A1 | 1/2011 | Kunzig et al. | |
| 2012/0123614 A1* | 5/2012 | Laws | G05B 19/4189 |
| | | | 701/2 |
| 2012/0191272 A1* | 7/2012 | Andersen | B66F 9/24 |
| | | | 705/28 |
| 2016/0090284 A1* | 3/2016 | Svensson | B66F 9/0755 |
| | | | 701/50 |
| 2019/0373476 A1* | 12/2019 | High | G05D 1/0212 |
| 2020/0331699 A1 | 10/2020 | Sullivan et al. | |
| 2021/0271246 A1* | 9/2021 | Takao | G05D 1/0212 |
| 2021/0333791 A1 | 10/2021 | Takao et al. | |
| 2022/0067960 A1* | 3/2022 | Guo | G06T 7/62 |
| 2024/0217792 A1* | 7/2024 | Kai | B66F 9/0755 |

FOREIGN PATENT DOCUMENTS

| | | |
|---|---|---|
| CN | 110697306 | 1/2020 |
| TW | 201510923 | 3/2015 |
| TW | 201815645 | 5/2018 |

OTHER PUBLICATIONS

Junhao Xiao1, et al., "Pallet recognition and localization using an RGB-D camera", International Journal of Advanced Robotic Systems, Sep. 13, 2017, pp. 1-10.

Luca Baglivo, et al., "Autonomous pallet localization and picking for industrial forklifts: a robust range and look method", Measurement Science and Technology, Aug. 2011, pp. 1-20.

"Search Report of Europe Counterpart Application", issued on Jun. 14, 2022, p. 1-p. 8.

"Office Action of Europe Counterpart Application", issued on Sep. 30, 2024, p. 1-p. 5.

* cited by examiner

HANDLING MACHINE CONTROL METHOD, HANDLING MACHINE CONTROL SYSTEM AND CONTROL HOST

CROSS-REFERENCE TO RELATED APPLICATION

This application claims the priority benefit of Taiwan application serial no. 110143515, filed on Nov. 23, 2021. The entirety of the above-mentioned patent application is hereby incorporated by reference herein and made a part of this specification.

TECHNICAL FIELD

This disclosure relates to a handling machine control method, a handling machine control system and a control host.

BACKGROUND

As people's transaction patterns change and the demand for automated logistics management such as smart warehousing is growing, it is desirable for an increasing number of logistics companies to use automated handling devices to automatically complete the handling of goods and the loading and unloading of goods. However, the cargo to be transported and/or the pallets carrying the cargo are often arranged irregularly in the physical space. Therefore, it is not easy to complete the automated handling of goods through simple coordinate setting.

SUMMARY

In view of this, the disclosure provides a handling machine control method, a handling machine control system and a control host, which can improve the efficiency of automated cargo handling.

An embodiment of the disclosure provides a handling machine control method, which is adaptable for a handling machine control system. The handling machine control method includes: detecting a handling instruction which instructs a handling of a first object; reading handling information of the first object according to the handling instruction; if the handling information of the first object is read, controlling, according to the handling information of the first object, a first handling machine to move to a first position and perform a first operation to lift up the first object at the first position; after the first object is lifted up, controlling the first handling machine to move to a second position and perform a second operation to put down the first object at the second position; and in response to that the first object is put down at the second position, updating the handling information of the first object.

An embodiment of the disclosure further provides a handling machine control system, which includes a control host and a first handling machine. The first handling machine is coupled to the control host. The control host is configured to: detect a handling instruction which instructs a handling of a first object; read handling information of the first object according to the handling instruction; if the handling information of the first object is read, control, according to the handling information of the first object, the first handling machine to move to a first position and perform a first operation to lift up the first object at the first position; after the first object is lifted up, control the first handling machine to move to a second position and perform a second operation to put down the first object at the second position; and in response to that the first object is put down at the second position, update the handling information of the first object.

An embodiment of the disclosure further provides a control host, which is adapted to control at least one handling machine. The control host includes a storage circuit and a processor. The storage circuit is configured for storing the handling information of the first object. The processor is coupled to the storage circuit. The processor is configured to: detect a handling instruction which instructs a handling of a first object; read handling information of the first object according to the handling instruction; if the handling information of the first object is read, control, according to the handling information of the first object, a first handling machine among the at least one handling machine to move to a first position and perform a first operation to lift up the first object at the first position; after the first object is lifted up, control the first handling machine to move to a second position and perform a second operation to put down the first object at the second position; and in response to that the first object is put down at the second position, update the handling information of the first object.

Based on the above, after detecting the handling instruction, the system can try to read the handling information of the first object. According to the handling information of the first object, the system can control the first handling machine to move to the first position and perform the first operation to lift up the first object at the first position. After the first object is lifted up, the system can control the first handling machine to move to the second position and perform the second operation to put down the first object at the second position. In addition, in response to the first object being put down at the second position, the handling information of the first object can be updated. In this way, the efficiency of automated cargo handling can be effectively improved.

DETAILED DESCRIPTION OF DISCLOSED EMBODIMENTS

Figure 1:
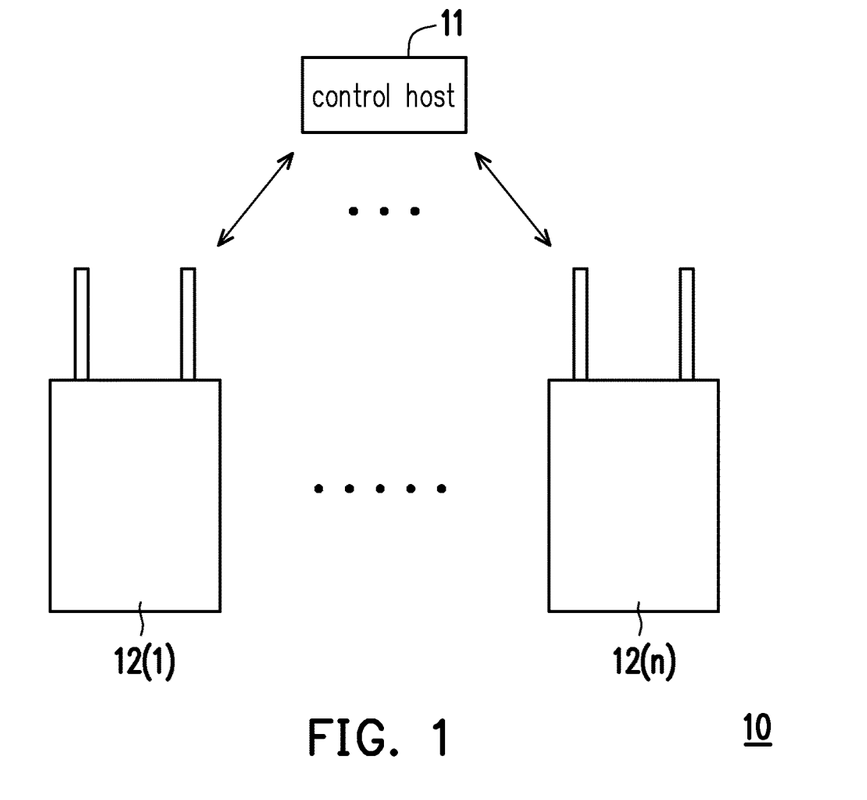
FIG. 1 is a schematic diagram of a handling machine control system according to an embodiment of the disclosure.

FIG. 1 is a schematic diagram of a handling machine control system according to an embodiment of the disclosure. Please refer to FIG. 1, the system (also referred to as the handling machine control system) 10 includes a control host 11 and handling machines 12(1) to 12(n). The control host 11 can be configured to manage and control the handling machines 12(1) to 12(n). For example, the control host 11 can monitor the position, movement trajectory and posture of the handling machines 12(1) to 12(n) and control the handling machines 12(1) to 12(n) to move and/or handle specific objects. The total number of control host 11 and the total number of handling machines 12(1) to 12(n) can be adjusted according to practical requirements, and this disclosure is not limited thereto.

In an embodiment, the control host 11 is independently arranged outside the handling machines 12(1) to 12(n) and can communicate with the handling machines 12(1) to 12(n) wirelessly. For example, the control host 11 may include a desktop computer, a notebook computer, a smart phone, a tablet computer, an industrial computer, a server, or other types of computer devices with data transmission and processing functions. Alternatively, in an embodiment, the control host 11 can also be distributed in the handling machines 12(1) to 12(n) to form a distributed control network, and the handling machines 12(1) to 12(n) can perform wireless communication with each other.

The handling machines 12(1) to 12(n) can be used to move, lift up or put down specific objects. Taking the handling machine 12(1) as an example, the handling machine 12(1) may have a moving and rotating mechanism to perform actions such as going forward, going backward, and/or turning on the ground. In addition, the handling machine 12(1) may have one or more extension arms. For example, the handling machine 12(1) can control its extension arm to move vertically or horizontally. In this way, the handling machine 12(1) can use an extension arm to handle specific objects. For example, the handling machine 12(1) can be an object handling device such as a stacker, a pallet truck, or a forklift. The extension arm of the handling machine 12(1) can be implemented as a mechanical component such as a clamp, a tray, or a mechanical arm that can be used to handle specific objects. Moreover, the handling machine 12(1) can be configured to handle the object to be handled itself, or a conveyer such as a pallet, a tray, or a carrier used to carry the object to be handled.

Figure 2:
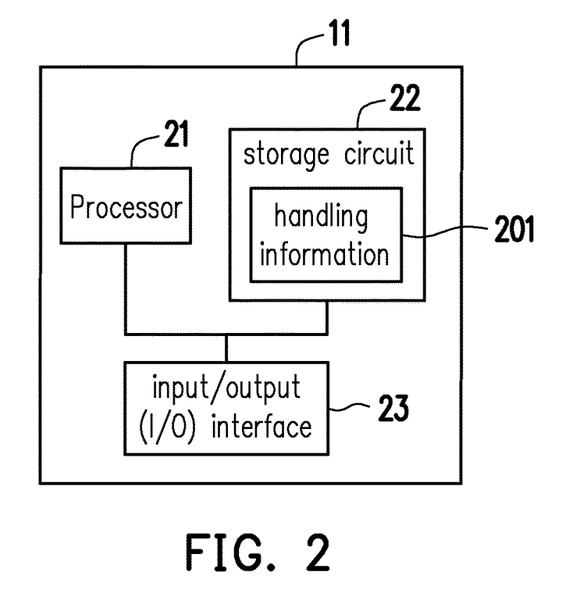
FIG. 2 is a functional block diagram of a control host according to an embodiment of the disclosure.

FIG. 2 is a functional block diagram of the control host according to an embodiment of the disclosure. Please refer to FIG. 2, the control host 11 includes a processor 21, a storage circuit 22 and an input/output (I/O) interface 23. The processor 21 can be configured to control the whole or part of the operation of the control host 11. For example, the processor 21 may include a central processing unit (CPU), or other programmable general-purpose or special-purpose microprocessors, digital signal processors (DSP), programmable controller, application specific integrated circuits (ASIC), programmable logic device (PLD) or other similar devices or a combination of these devices. It should be noted that in the following embodiments, the description of the processor 21 is equivalent to the description of the control host 11.

The storage circuit 22 is coupled to the processor 21 and configured to store data. For example, the storage circuit 22 may include a volatile storage circuit and a non-volatile storage circuit. The volatile storage circuit is configured to volatilely store data. For example, the volatile storage circuit may include a random access memory (RAM) or similar volatile storage media. The non-volatile storage circuit is configured for non-volatilely storing data. For example, the non-volatile storage circuit may include a read only memory (ROM), a solid state disk (SSD), a conventional hard disk drive (HDD) or similar non-volatile storage media.

The input/output interface 23 is coupled to the processor 21 and configured to transmit signals. For example, the processor 21 can receive input signals or transmit output signals through the input/output interface 23. For example, the input/output interface 23 may include various input/output devices such as a wireless communication interface (such as a wireless network card), a mouse, a keyboard, a monitor, a touch panel, and/or a speaker.

In an embodiment, the processor 21 can detect a handling instruction. This handling instruction can be used to instruct handling of a specific object (also referred to as the first object). For example, the processor 21 may receive a handling instruction input by an administrator through the input/output interface 23. Alternatively, the processor 21 may automatically generate and detect the handling instruction according to a system schedule. In an embodiment, the processor 21 can determine the object to be handled (i.e., the first object) according to the handling instruction and try to read the handling information 201 of the first object from the storage circuit 22.

In an embodiment, if the handling information 201 can be read (for example, the handling information 201 is currently stored in the storage circuit 22 and can be read normally), the processor 21 can control, according to the handling information 201, a certain handling machine (also referred to as the first handling machine) to move to a specific position (also referred to as the first position) and perform a specific operation (also referred to as a first operation) to lift up (including clamping or forklifting) the first object at the first position.

In an embodiment, the first operation includes adjusting the posture of the first handling machine so that the first handling machine lifts up the first object based on a specific posture (also referred to as the first posture). For example, the step of adjusting the posture of the first handling machine includes adjusting the angle between the extension arm of the first handling machine and the first object, so that the extension arm of the first handling machine is at a position suitable for lifting up the first object. In this manner, with the first posture, the first handling machine can use the extension arm to lift up the first object smoothly. From another perspective, the first posture can reflect the posture of the first handling machine when lifting up the first object at the first position. For example, the first posture may reflect that the first handling machine lifts up the first object in a specific angle state (also referred to as the first angle state).

Figure 3:
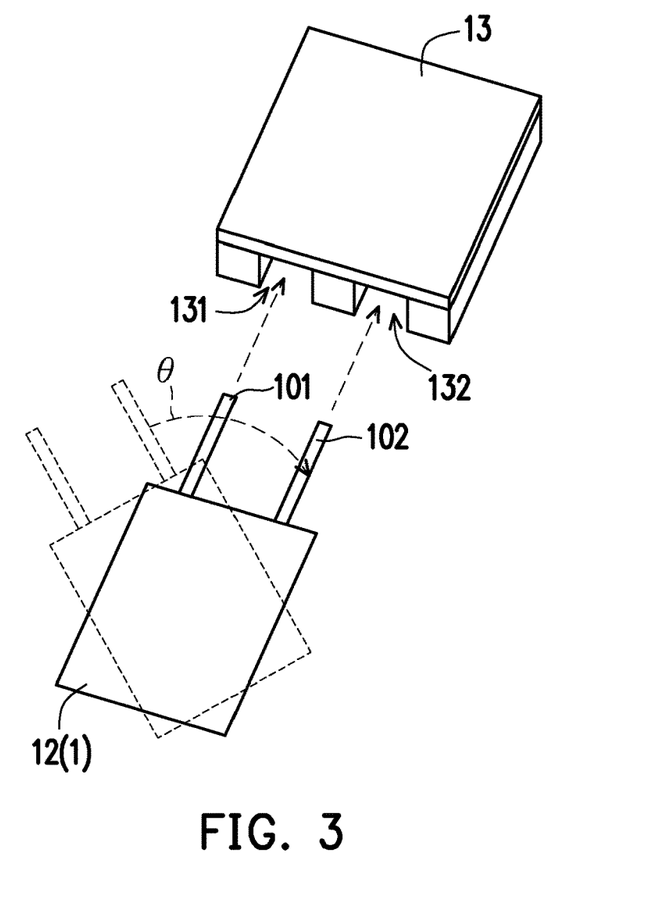
FIG. 3 is a schematic diagram of adjusting the posture of the first handling machine according to an embodiment of the disclosure.

FIG. 3 is a schematic diagram of adjusting the posture of the first handling machine according to an embodiment of the disclosure. Please refer to FIG. 1 to FIG. 3, assuming that the first handling machine is the handling machine 12(1) and the first object is an object 13. For example, the object 13 may be a pallet. After controlling the handling machine 12(1) to move to the vicinity (i.e., the first position) of the position of the object 13, the processor 21 can adjust the posture of the handling machine 12(1) according to the handling information 201. For example, the processor 21 can control the handling machine 12(1) to rotate a specific angle $\ominus$ at the first position according to the handling information 201, so that the extension arms 101 and 102 of the handling machine 12(1) are aligned with the grooves 131 and 132 under the object 13, respectively. After the handling machine 12(1) is controlled to rotate by the angle $\ominus$ at the first position, it can be regarded that the handling machine 12(1) is in the first posture. Under the circumstances, the processor 21 can control the handling machine 12(1) to lift up the first object based on the first posture. For example, the processor 21 can control the handling machine 12(1) to extend the extension arms 101 and 102 forward and insert them into the grooves 131 and 132, respectively. After the extension arms 101 and 102 are inserted into the grooves 131 and 132, respectively, the processor 21 can control the handling machine 12(1) to lift up the object 13.

In an embodiment, after the first object is lifted up, the processor 21 may continue to control the first handling machine to move to another position (also referred to as the second position) and perform another operation (also referred to as second operation) to put down the first object at the second position. The second position is different from the first position.

In an embodiment, the second operation includes adjusting the posture of the first handling machine so that the first handling machine puts down the first object based on another posture (also referred to as the second posture). For example, at the second position, the processor 21 may control the first handling machine to rotate another specific angle. Then, the processor 21 can control the first handling machine to put down the first object in a specific angle state (also referred to as a second angle state). In other words, the second posture can reflect the posture of the first handling machine when putting down the first object at the second position. For example, the second posture may reflect that the first handling machine puts down the first object in a specific angle state (i.e., the second angle state).

In an embodiment, the processor 21 may detect the first posture and the second posture through a sensor arranged inside the first handling machine. For example, the sensor may include a sensor that senses the current posture (such as the angle state) of the handling machine such as a global positioning system (GPS) sensor, a G-sensor, an accelerometer and/or a gyroscope, etc.

In an embodiment, in response to the first object being placed at the second position, the processor 21 may update the handling information 201. For example, the processor 21 may update the handling information 201 from the current handling information (also referred to as the first handling information) to the new handling information (also referred to as the second handling information). The first handling information carries information related to the first posture. For example, the first handling information may carry the information of the first angle state (for example, the angle value of the first handling machine in the first posture). The second handling information carries information related to the second posture. For example, the second handling information can carry the information of the second angle state (for example, the angle value of the first handling machine in the second posture). In an embodiment, the first handling information further carries information related to the first position. For example, the first handling information may carry the information of the first position (for example, the coordinates of the first position). In an embodiment, the second handling information further carries information related to the second position. For example, the second handling information may carry the information of the second position (for example, the coordinates of the second position).

In an embodiment, after determining the object to be handled (i.e., the first object), the processor 21 can obtain the position of the first object (i.e., the first position) and the posture (that is, the first posture) to be used to lift up the first object according to the handling information 201. In this way, the processor 21 can control, according to the handling information 201, the first handling machine to move to the first position and lift up the first object based on the first posture. In addition, after the first object is put down at the second position, the processor 21 can update the information of the second position and the second posture to the handling information 201. Thereafter, when the first object needs to be handled again, the processor 21 may control, according to the updated handling information 201, another handling machine to move to the second position and lift up the first object again based on the second posture.

In an embodiment, the first handling machine may have a camera modules. For example, the camera modules may include a two-dimensional (2D) camera and/or a three-dimensional (3D) camera. A two-dimensional camera can be used to capture two-dimensional images. A 3D camera can be used to capture 3D images. Compared with a two-dimensional image, a three-dimensional image can further carry depth information of the object (such as the first object) in the image. The depth information can be used to reflect the distance between the object and the camera modules (or the first handling machine). In an embodiment, the camera modules may also include various optical sensors and/or depth sensors such as lidar, and the disclosure provides no limitation to the type of the camera modules.

In an embodiment, the first handling machine may not have a camera modules. In an embodiment, regardless of whether the first handling machine has a camera modules or not, according to the handling information 201, the processor 21 can control the first handling machine according to the handling information 201 to move to the first position and perform the first operation to lift up the first object at the first position without performing image recognition on the first object by the first handling machine.

In an embodiment, after detecting the handling instruction, if the handling information (for example, handling information 201) of the first object cannot be read, the processor 21 may control another handling machine (also referred to as the second handling machine) to move to the first position and perform image recognition through the second handling machine to detect the first object at the first position. In particular, the second handling machine has a camera modules. The processor 21 can control the second handling machine to perform the first operation to lift up the first object according to the recognition result of the image recognition. After the first object is lifted up, the processor 21 can control the second handling machine to move to the second position and perform the second operation to put down the first object at the second position. In response to the first object being put down at the second position, the processor 21 may further update the handling information of the first object. For example, the processor 21 can update the information of the second position and the second posture to the handling information 201 and store the handling information 201 in the storage circuit 22. Thereafter, the processor 21 may query the handling information 201 to automatically handle the first object.

Figure 4:
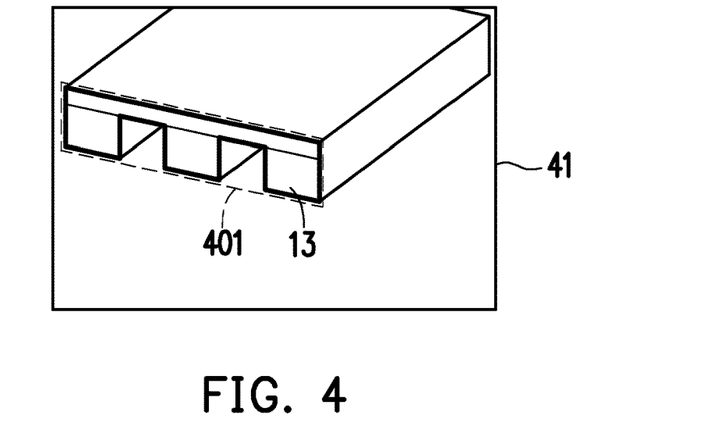
FIG. 4 is a schematic diagram of image recognition according to an embodiment of the disclosure.

FIG. 4 is a schematic diagram of image recognition according to an embodiment of the disclosure. Referring to FIG. 4, in an embodiment, if the handling information (for example, handling information 201) of the first object cannot be read, the processor 21 may control the second handling machine to move to the first position where the first object is located and capture an image 41 through the camera modules of the second handling machine. The image 41 exhibits at least a part of the first object (i.e., the object 13). The processor 21 can perform image recognition on the image 41 to detect a specific region 401 in the image 41. The processor 21 can adjust the angle between the extension arm of the second handling machine and the first object according to the pixel distribution of the image in the specific region 401, so that the extension arm of the second handling machine is in a position suitable for lifting up the first object. Then, the processor 21 can control the extension arm of the second handling machine to extend forward and lift up the first object. For details of related operations, refer to the embodiment in FIG. 3, and no repetition is incorporated herein. In addition, the image recognition can be performed by trained deep learning models, neural network models or similar artificial intelligence models.

In an embodiment, the handling information of multiple objects to be handled can be stored in the storage circuit 22 of the control host 11 in a centralized manner. When it is necessary to query the handling information of a specific object, the control host 11 can control the specific handling machine to handle the specific object according to the handling information corresponding to the specific object in the storage circuit 22. Or, in an embodiment, the handling information of multiple objects to be handled can also be shared between multiple handling machines (for example, handling machines 12(1) to 12(n) in FIG. 1) through a distributed network architecture.

Figure 5:
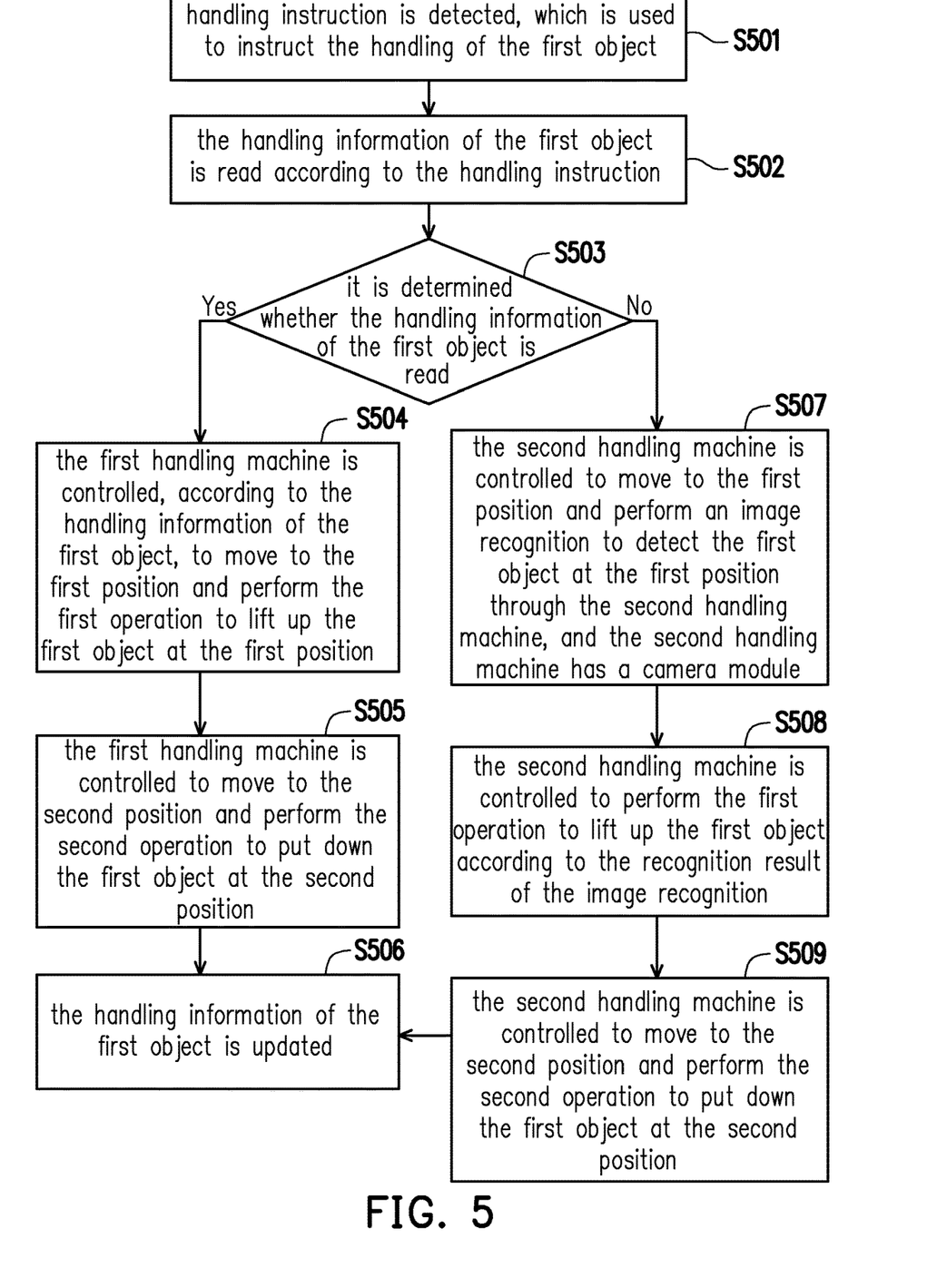
FIG. 5 is a flowchart of a handling machine control method according to an embodiment of the disclosure.

FIG. 5 is a flowchart of a handling machine control method according to an embodiment of the disclosure. Please refer to FIG. 5, in step S501, a handling instruction is detected, which is used to instruct the handling of the first object. In step S502, the handling information of the first object is read according to the handling instruction. In step S503, it is determined whether the handling information of the first object is read.

If the handling information of the first object is read, in step S504, the first handling machine is controlled, according to the handling information of the first object, to move to the first position and perform the first operation to lift up the first object at the first position. After the first object is lifted up, in step S505, the first handling machine is controlled to move to the second position and perform the second operation to put down the first object at the second position. In step S506, in response to the first object being put down at the second position, the handling information of the first object is updated.

On the other hand, if the handling information of the first object cannot be read, in step S507, the second handling machine is controlled, according to the handling information of the first object, to move to the first position and perform an image recognition to detect the first object at the first position through the second handling machine, and the second handling machine has a camera modules. In step S508, the second handling machine is controlled to perform the first operation to lift up the first object according to the recognition result of the image recognition. After the first object is lifted up, in step S509, the second handling machine is controlled to move to the second position and perform the second operation to put down the first object at the second position. Thereafter, in step S506, in response to the first object being put down at the second position, the handling information of the first object is updated.

However, each step in FIG. 5 has been described in detail as above, and will not be repeated here. It should be noted that each step in FIG. 5 can be implemented as multiple program codes (such as a software module) or a circuit (such as a circuit module), and this disclosure provides no limitation thereto. In addition, the method of FIG. 5 can be used in conjunction with the above exemplary embodiments, or can be used alone, and this disclosure provides no limitation thereto.

In summary, the handling machine control method, the handling machine control system, and the control host provided in this disclosure can record the handling information (such as position information and posture information) when the handling machine handles the first object and store this information for handling the first object next time. By automatically handling objects based on the handling information of the objects and continuously updating the handling information of the objects, the entire handling system can achieve almost fully automated operation, thereby effectively improving the efficiency of automated handling of goods.

Although the disclosure has been disclosed as above by embodiments, it is not intended to limit the disclosure. Anyone with ordinary knowledge in the technical field can make some changes and refinement without departing from the spirit and scope of the disclosure. Therefore, the scope to be protected by this disclosure shall be subject to the scope of the attached claims.

What is claimed is:

1. A handling machine control method, adaptable for a handling machine control system, wherein the handling machine control method comprises:

detecting a handling instruction which instructs a handling of a first object;

reading handling information of the first object according to the handling instruction;

before controlling any one of a first handling machine and a second handling machine to move the first object, determining whether the handling information of the first object can be read, wherein the first handling machine does not have any camera module, and the second handling machine has a camera module;

in response to a determination result reflecting that the handling information of the first object is read, controlling, according to the handling information of the first object, the first handling machine to move to a first position and perform a first operation to lift up the first object at the first position;

after the first object is lifted up by the first handling machine, controlling the first handling machine to move to a second position and perform a second operation to put down the first object at the second position;

in response to a determination result reflecting that the handling information of the first object cannot be read, controlling the second handling machine to move to the first position and perform an image recognition, by the second handling machine, to detect a specific region in an image captured by the camera module;

adjusting an angle between an extension arm of the second handling machine and the first object according to a pixel distribution of the image in the specific region and then controlling the extension arm of the second handling machine to extend forward and lift up the first object;

after the first object is lifted up by the second handling machine, controlling the second handling machine to move to the second position and perform a second operation to put down the first object at the second position; and in response to that the first object is put down at the second position, updating the handling information of the first object.

2. The handling machine control method according to claim 1, wherein the first operation comprises adjusting a posture of the first handling machine so that the first handling machine lifts up the first object based on a first posture, and the second operation comprises adjusting the posture of the first handling machine so that the first handling machine puts down the first object based on a second posture.

3. The handling machine control method according to claim 2, wherein the step of updating the handling information of the first object comprises:

updating the handling information of the first object from first handling information to second handling information, wherein the first handling information carries information related to the first posture, and the second handling information carries information related to the second posture.

4. The handling machine control method according to claim 1, wherein the step of controlling, according to the handling information of the first object, the first handling machine to move to the first position and perform the first operation to lift up the first object at the first position comprises:
controlling the first handling machine according to the handling information of the first object to move to the first position and perform the first operation to lift up the first object at the first position without performing an image recognition on the first object by the first handling machine.

5. A handling machine control system, comprising:
a processor;
a second handling machine, coupled to the processor; and
a first handling machine, coupled to the processor,
wherein the processor is configured to:
detect a handling instruction which instructs a handling of a first object;
read handling information of the first object according to the handling instruction;
before controlling any one of the first handling machine and the second handling machine to move the first object, determine whether the handling information of the first object can be read, wherein the first handling machine does not have any camera module, and the second handling machine has a camera module;
in response to a determination result reflecting that the handling information of the first object is read, control, according to the handling information of the first object, the first handling machine to move to a first position and perform a first operation to lift up the first object at the first position;
after the first object is lifted up by the first handling machine, control the first handling machine to move to a second position and perform a second operation to put down the first object at the second position;
in response to a determination result reflecting that the handling information of the first object cannot be read, control the second handling machine to move to the first position and perform an image recognition, by the second handling machine, to detect a specific region in an image captured by the camera module;
adjust an angle between an extension arm of the second handling machine and the first object according to a pixel distribution of the image in the specific region and then control the second handling machine to extend forward and lift up the first object;
after the first object is lifted up by the second handling machine, control the second handling machine to move to the second position and perform a second operation to put down the first object at the second position; and
in response to that the first object is put down at the second position, update the handling information of the first object.

6. The handling machine control system according to claim 5, wherein the first operation comprises adjusting a posture of the first handling machine so that the first handling machine lifts up the first object based on a first posture, and
the second operation comprises adjusting the posture of the first handling machine so that the first handling machine puts down the first object based on a second posture.

7. The handling machine control system according to claim 6, wherein the operation of updating the handling information of the first object comprises:
updating the handling information of the first object from first handling information to second handling information, wherein the first handling information carries information related to the first posture, and the second handling information carries information related to the second posture.

8. The handling machine control system according to claim 5, wherein the operation of controlling, according to the handling information of the first object, the first handling machine to move to the first position and perform the first operation to lift up the first object at the first position comprises:
controlling the first handling machine according to the handling information of the first object to move to the first position and perform the first operation to lift up the first object at the first position without performing an image recognition on the first object by the first handling machine.

9. A control host for controlling at least one handling machine, and the control host comprising:
a storage circuit, configured for storing handling information of a first object; and
a processor, coupled to the storage circuit,
wherein the processor is configured to:
detect a handling instruction which instructs a handling of the first object;
read the handling information of the first object according to the handling instruction;
before controlling any one of a first handling machine and a second handling machine to move the first object, determine whether the handling information of the first object can be read, wherein the first handling machine does not have any camera module, and the second handling machine has a camera module;
in response to a determination result reflecting that the handling information of the first object is read, control, according to the handling information of the first object, the first handling machine among the at least one handling machine to move to a first position and perform a first operation to lift up the first object at the first position;
after the first object is lifted up by the first handling machine, control the first handling machine to move to a second position and perform a second operation to put down the first object at the second position;
in response to a determination result reflecting that the handling information of the first object cannot be read, control a second handling machine among the at least one handling machine to move to the first position and perform an image recognition, by the second handling machine, to detect a specific region in an image captured by the camera module;
adjust an angle between an extension arm of the second handling machine and the first object according to a pixel distribution of the image in the specific region and then control the second handling machine to extend forward and lift up the first object;

after the first object is lifted up by the second handling machine, control the second handling machine to move to the second position and perform a second operation to put down the first object at the second position; and in response to that the first object is put down at the second position, update the handling information of the first object.

10. The control host according to claim 9, wherein the first operation comprises adjusting a posture of the first handling machine so that the first handling machine lifts up the first object based on a first posture, and the second operation comprises adjusting the posture of the first handling machine so that the first handling machine puts down the first object based on a second posture.

11. The control host according to claim 10, wherein the operation of updating the handling information of the first object comprises:

updating the handling information of the first object from first handling information to second handling information, wherein the first handling information carries information related to the first posture, and the second handling information carries information related to the second posture.

12. The control host according to claim 9, wherein the operation of controlling, according to the handling information of the first object, the first handling machine to move to the first position and perform the first operation to lift up the first object at the first position comprises:

controlling the first handling machine according to the handling information of the first object to move to the first position and perform the first operation to lift up the first object at the first position without performing an image recognition on the first object by the first handling machine.

* * * * *